N. C. CROSS.
COMBINED PLANTER AND FERTILIZER DISTRIBUTER.
APPLICATION FILED AUG. 19, 1912.

1,090,284.

Patented Mar. 17, 1914.

2 SHEETS—SHEET 1.

Witnesses
H. B. Wooden
L. H. Wilson

Noah C. Cross
Inventor,
by C. A. Snow & Co.
Attorneys.

N. C. CROSS.
COMBINED PLANTER AND FERTILIZER DISTRIBUTER.
APPLICATION FILED AUG. 19, 1912.
1,090,284.
Patented Mar. 17, 1914.
2 SHEETS—SHEET 2.
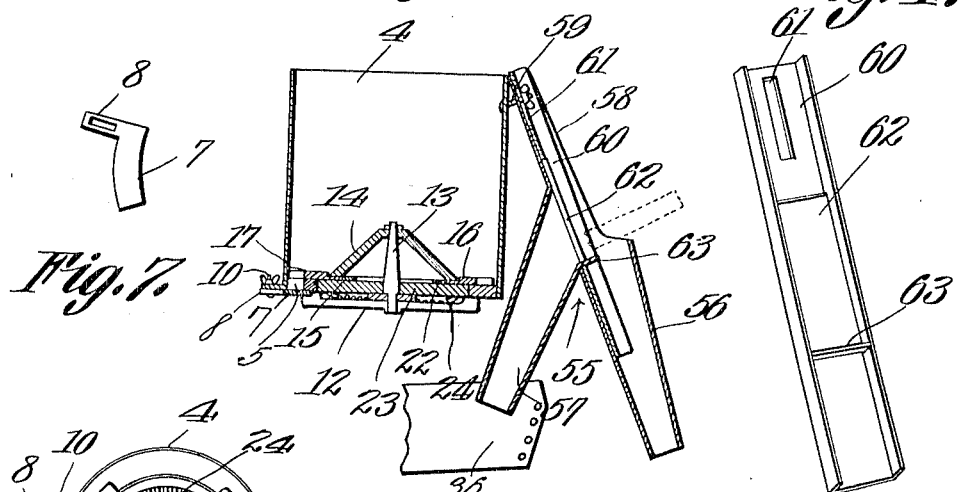
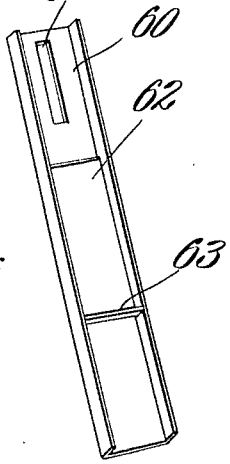
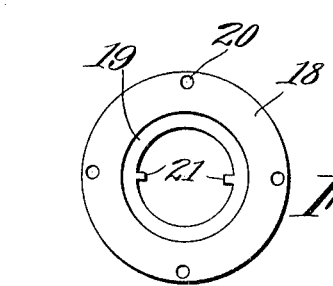
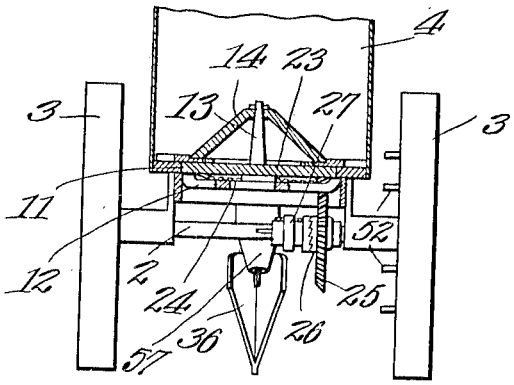
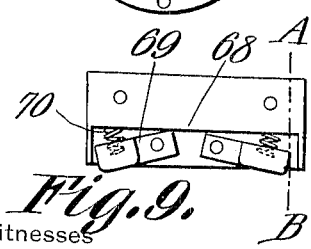
Witnesses
Noah C. Cross
Inventor,
by C. A. Snow & Co.
Attorneys.

UNITED STATES PATENT OFFICE.

NOAH C. CROSS, OF BUFORD, GEORGIA.

COMBINED PLANTER AND FERTILIZER-DISTRIBUTER.

1,090,284.   Specification of Letters Patent.   Patented Mar. 17, 1914.

Application filed August 19, 1912. Serial No. 715,911.

*To all whom it may concern:*

Be it known that I, NOAH C. CROSS, a citizen of the United States, residing at Buford, in the county of Gwinnett and State of Georgia, have invented a new and useful Combined Planter and Fertilizer-Distributer, of which the following is a specification.

This invention relates to a combined planter and fertilizer distributer, the principal object of the invention being to provide means whereby fertilizer can be deposited at any desired depth and either below and in advance of the seed or together with the seed, as may be desired.

A further object is to provide improved means under the constant control of the operator whereby the fertilizer can be directed into either of two positions in the soils and relative to the seeds deposited.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

Figure 1:
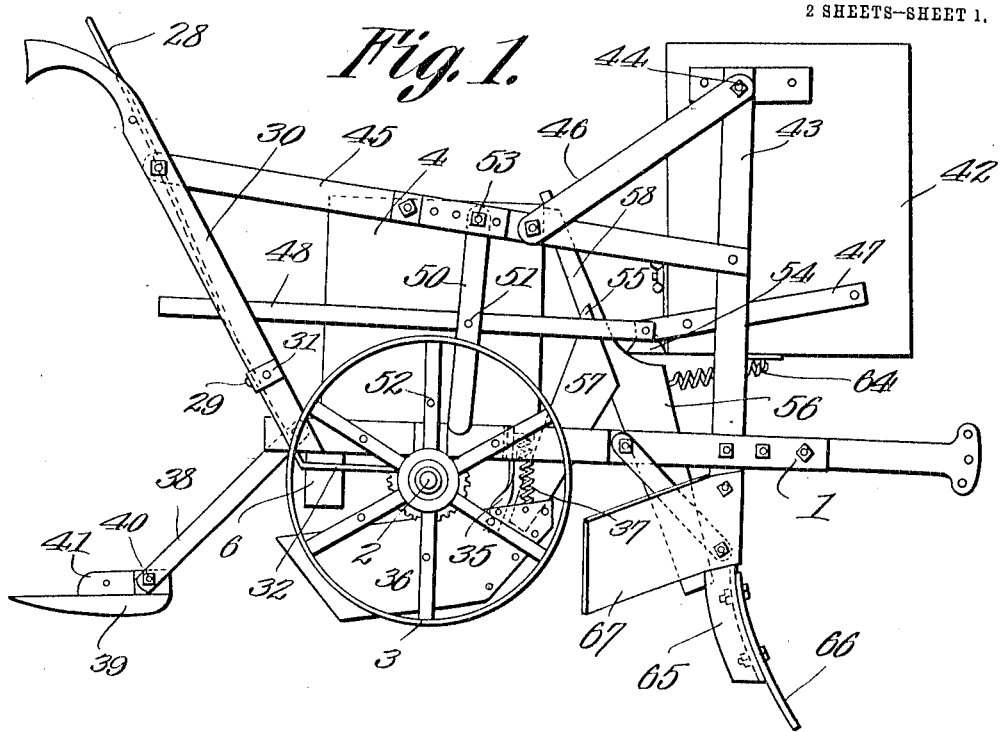
Figure 2:
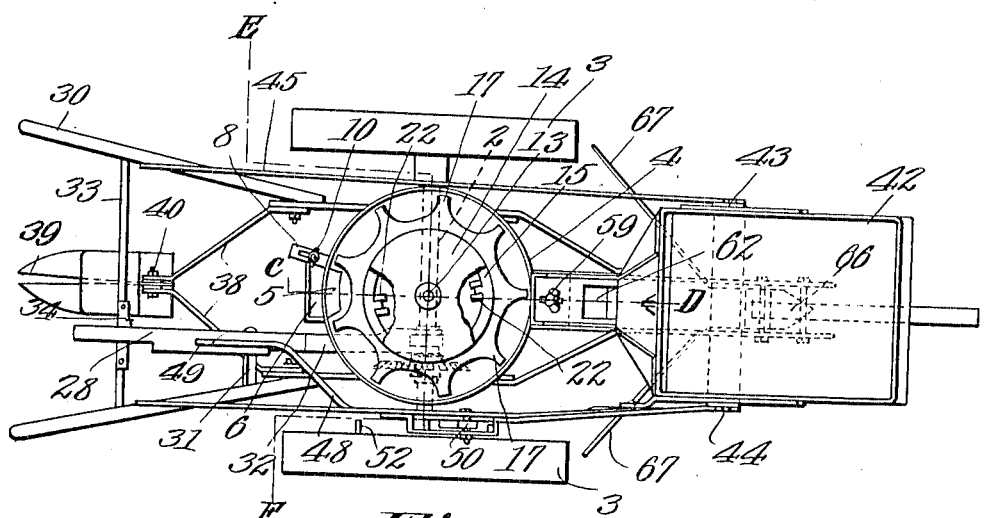

In said drawings:—Figure 1 is a side elevation of the machine. Fig. 2 is a plan view thereof, parts being broken away. Fig. 3 is a vertical longitudinal section through the seed box and through a portion of the fertilizer distributing spout, said section being taken on the line C—D Fig. 2. Fig. 4 is a perspective view of the controlling slide used in connection with the chute or spout. Fig. 5 is a vertical transverse section through the spout and showing the parts in elevation, said section being taken on the line E—F Fig. 2. Fig. 6 is a bottoms plan view of the seed box. Fig. 7 is a detail view of the cut-off slide used in connection with the seed box. Fig. 8 is a plan view of a dropper plate used in planting corn. Fig. 9 is a detail view of the seed ejecting means used in connection with the structure shown in Fig. 8. Fig. 10 is a section on line A—B Fig. 9.

Referring to the figures by characters of reference 1 designates the main structure of the machine, the same being supported near its rear end upon a revoluble axle 2 to which supporting or ground wheels 3 are secured. Mounted upon the axle is a seed box 4 having a feed outlet 5 in the bottom thereof and which is located above an outlet spout 6. This seed outlet is adapted to be entirely or partly closed by means of an arcuate cut-off plate 7 having a longitudinally slotted arm 8 projecting therefrom and adapted to be secured against movement in any preferred manner, as by means of a wing nut 10 or any other suitable binding device, as shown particularly in Figs. 2 and 6. The bottom of the seed box 4 is provided with a circular opening 11 and extending across the opening and over the bottom is a spider 12 having a stem 13 projecting upwardly therefrom. A conical cap 14 is secured upon the stem and is concentric therewith, this cap resting within a circular channel or rabbet 15 formed along a circular opening within a detachable dropper plate 16.

Where the machine is to be used in planting cotton seed, the dropper plate 16 is preferably in the form of a ring having outstanding fingers 17, as shown in Fig. 2. Where the machine is to be used in planting corn, a ring such as shown at 18 in Fig. 8 is preferably employed, this ring being formed with an inner channel or rabbet 19 designed to receive the cap 14 and likewise provided with seed receiving openings 20. Both forms of seed dropping plates having inwardly directed oppositely disposed lugs 21 and these lugs are adapted to be seated between projections 22 upstanding from a plate 23 which is arranged to rotate within the opening 11 and about the stem 13. Said plate 23 has a gear 24 upon its lower face and this gear is adapted to mesh with a drive gear 25 loosely mounted on the axle. Gear 25 has a clutch member 26 connected thereto and another clutch member 27 is feathered on the axle 2 and is adapted to be shifted in any preferred manner into and out of engagement with the clutch member 26 so as thus to couple or uncouple gear 25 from the axle and therefore control the transmission of power from the axle to seed dropping plate. One means for shifting the clutch member 27 has been illustrated in the drawings and includes a lever 28 which is fulcrumed, as at 29, between the upstanding handles 30, these handles being fixedly secured to the structure 1 and one of them having a bracket 31 on which the lever is fulcrumed, as shown in Fig. 2. An arm 32 extends forwardly from the lower end of the lever and loosely engages the clutch member 27 so that when lever 28 is swung to the right or to the left the clutch member 27 will be shifted along the axle 2. A cross bar 33 is preferably mounted between the handles 30 and has a toothed holding strip 34 secured thereto and adapted to be engaged by lever 28, thus holding the lever against movement after the clutch members have been placed in engagement with each other.

A hanger 35 extends downwardly from the front portion of the seed box 4 and pivotally connected thereto are rearwardly diverging blades 36 connected at their front and lower edges so as to constitute means for opening a shallow furrow into which seeds, dropped from the box 4, may be deposited. The front end portions of the plates 36 are connected to the front portion of the box 4 by means of a spring 37, this spring serving to press the rear portions of the blades yieldingly against the soil so as to cause them to open the furrow.

Rearwardly converging arms 38 are pivotally connected to the back portion of the structure 1 and transversely arched smoothing plates 39 are pivotally connected to these arms, as at 40. These plates are movable independently of each other and a weight 41 bears downwardly on them, this weight being pivotally connected to the arms 38 and serving to hold either or both of the plates 39 firmly in contact with the soil.

A fertilizer box 42 is supported above the front portion of the structure 1 and is arranged between standards 43, there being pivotal connections between the upper ends of the standards and the sides of the fertilizer box, these connections being indicated at 44. The standards 43 are connected to the handles 30 by side strips 45 and braces 46 may be extended from these strips to the upper end portions of the standards. An arm 47 is attached to one side of the box 42 and a connecting strip 48 is pivotally attached to this arm and extends loosely through a slot 49 formed within the lever 28. A hanger 50 is pivotally attached to one of the side strips 45 and is also pivotally connected, as at 51, to the strip 48. This hanger projects, at its lower end, into the path of a series of tappets 52 which extend inwardly from one of the wheels 3 and are adapted successively to engage the hanger 50 and cause it to swing about its pivot 53. It will be apparent that when the lever 28 is shifted laterally in one direction for the purpose of disengaging the clutch members 27 and 26, the strip 48 will likewise be swung laterally so as to move the lower end of the hanger 50 out of the path of the tappets 52.

The fertilizer box 42 has an outlet spout 54 extending rearwardly therefrom and adapted to discharge into a forked chute 55 arranged between the boxes 4 and 42. The front member 56 of the forked chute extends downwardly and forwardly while the rear member 57 of the chute extends downwardly and rearwardly, its lower end being located in a horizontal plane above the lower end of the member 56. The two members communicate at their upper ends and a longitudinally channeled extension 58 extends upwardly from the member 56 and is supported in any suitable manner from the front portion of the seed box 4. As shown in Fig. 3 this extension is connected to the box 4 by means of bolt 59 constituting a guide for an adjusting member 60 which is slidably mounted in the extension 58. This adjusting member is channeled longitudinally, as shown in Fig. 4 and has a longitudinal slot 61 through which the bolt 59 extends, said bolt being provided with a wing nut whereby the adjusting member can be clamped upon the extension. An elongated opening 62 is formed in the member 60 and extends practically throughout the width thereof and a deflecting lip 63 extends transversely of the member and along the lower edge of the opening. When the member 60 is in its lowermost position the opening 62 registers with the upper end of the member 57 of the chute and the lip 63 is arranged along the lower edge of the upper end of said member 57. When, however, the member 60 is elevated to its greatest extent, the lip 63 is brought to a point close to the upper edge of the upper end of member 57 and said member is thus practically closed. Obviously, therefore, material discharged from the spout 54 can be directed into either of the members 57 and 56, this being dependent upon the position of the adjusting member 60 upon the extension 58. A spring 64 connects the lower portion of the box 42 to the member 56 and serves to hold the spout 54 normally drawn toward the extension 58. The standards 43 converge downwardly and are secured to a stock 65 to which is attached a narrow furrow opening blade such as a bull tongue 66. Rearwardly diverging sweeps 67 are connected to the standards 43 and above the blade 66 and the member 56 of the chute is so positioned as to discharge fertilizer close to the rear surface of the stock 65 and at a point slightly below the sweep.

Under normal conditions the clutch members 26 and 27 are disengaged from each other and, therefore, the hanger 50 is withdrawn from the path of the tappets 52 this being due to the fact, that, as hereinbefore described, the lever 28, when shifted in one direction, operates to move the clutch member 27 and the lower end of the hanger 50 in one direction simultaneously. Obviously, therefore, during the forward movement of the machine, none of the mechanisms of the fertilizer and seed droppers will be operated. When lever 28 is shifted in the opposite direction so as to bring the clutch members 26 and 27 into engagement with each other and to bring the lower end of the hanger 50 into the path of the tappets 52, the gears 25 and 24 actuate the seed dropping plate and the seed will thus be discharged through the opening 5 and into the shallow furrow produced by the rearwardly diverging blades 36. At the same time the hanger 50 will be shifted intermittently as the tappets come successively into contact therewith and motion will therefore be transmitted through the strip 48 to arm 47 and the fertilizer box 32 will therefore be swung about its pivot 44. The contents of the box will therefore be kept under agitation and will be discharged onto the spout 54 and thence into the chute 55. If the adjusting member 60 is in its uppermost position, the fertilizer, upon leaving the spout 54, will be deposited onto the lower portion of the member 60 and below the lip 63 and will thus be deflected into the lower member 56. The blade 66 produces a furrow of any desired depth and the fertilizer discharged into the member 56 will drop into the furrow directly back of the blade and will be covered by the loose soil which falls back into the furrow. The blades 36 following the blade 66 operate to produce a shallow furrow into which the seeds drop and the covering plates 39 following the plates 36 direct loose soil onto the seeds and smooth and shape the hill.

Should it be desired to deposit the fertilizer at practically the same depth as the seeds, the adjusting member 60 is shifted downwardly so as to bring the lip 63 below the spout 54. The fertilizer discharged from the spout will thus be deposited on the lip and will be directed into the member 57 of the chute so as to be directed onto the soil close to the point where the seeds are deposited.

If the machine is to be utilized for planting corn, a dropping plate such as shown in detail in Fig. 8 is utilized and it is of course necessary to utilize some ejecting means for forcing the grain from the openings 20. One form of ejecting means has been illustrated in Figs. 9 and 10 and consists of a housing 68 adapted to be secured to the inner surface of the seed box 4 and directly above the outlet opening 5. Pivotally mounted within this housing are oppositely disposed ejecting blocks 69 having rounded lower or active faces which are held in contact with the plate 18 by means of springs 70 which bear downwardly on the blocks 69. Thus it will be seen that as the plate 18 is rotated, the openings 20 are brought successively under the blocks 69 and these blocks serve to press downwardly into the opening and to eject therefrom any seeds which may become lodged therein.

What is claimed is:—

1. The combination with front and back means for opening furrows of different depths, of a fertilizer receptacle, a forked chute for directing fertilizer into the respective furrows, means for directing fertilizer into the chute from the receptacle, an adjusting member for controlling the passage of fertilizer within the chute and into the respective furrows, and means for oscillating the receptacle.

2. The combination with front and rear means for opening furrows of different depths, of a forked chute for directing fertilizer into the respective furrows, an adjusting member carried by the chute for controlling the passage of fertilizer therethrough, a fertilizer receptacle discharging into the chute, and means for oscillating the receptacle.

3. The combination with front and rear means for opening furrows of different depths, of a forked chute having front and rear members for directing fertilizer into the respective furrows, a member adjustably mounted in the chute and having an opening adapted to register with the upper end of one of the members of the chute, there being an outstanding deflecting lip upon the member and along the lower edge of the opening, a fertilizer receptacle, and means for directing fertilizer therefrom and onto the member.

4. The combination with a structure including a supporting wheel and tappets extending from the wheel, of front and rear means for producing furrows of different depths, a chute having forwardly and rearwardly extending members for discharging fertilizer into the respective furrows, a member adjustably mounted in the chute and having an opening adapted to register with the upper end of the rear member of the chute, there being a lip upon said member and along the lower edge of the opening, a fertilizer receptacle mounted for oscillation, means for directing material therefrom and onto the adjustable member, a hanger pivotally supported and normally projecting into the path of the tappets, and a connection between the hanger and the receptacle.

5. The combination with a structure including a supporting wheel and tappets extending from the wheel, of front and rear means for producing furrows of different depths, a chute having forwardly and rearwardly extending members for discharging fertilizer into the respective furrows, a member adjustably mounted in the chute and having an opening adapted to register with the upper end of the rear member of the chute, there being a lip upon said member and along the lower edge of the opening, a fertilizer receptacle mounted for oscillation, means for directing material therefrom and onto the adjustable member, a hanger pivotally supported and normally projecting into the path of the tappets, a connection between the hanger and the receptacle, and means for shifting the hanger into and out of the path of the tappets.

In testimony that I claim the foregoing as my own, I have affixed my signature in the presence of two witnesses.

NOAH C. CROSS.

Witnesses:
 R. H. GORDY,
 W. A. PIRKK.

Copies of this patent may be obtained for five cents each, by addressing the "Commissioner of Patents, Washington, D. C."